MODULAR ELECTRONIC SUB-ASSEMBLIES AND METHOD OF FABRICATING

Filed April 15, 1958

2 Sheets-Sheet 1

Inventor:
Russell I. Mason,
by Roe D McBurnett
His Attorney.

Feb. 20, 1962 R. I. MASON 3,022,448

MODULAR ELECTRONIC SUB-ASSEMBLIES AND METHOD OF FABRICATING

Filed April 15, 1958 2 Sheets-Sheet 2

Inventor:
Russell I. Mason,
by Roe D. McBurnett
His Attorney.

3,022,448

MODULAR ELECTRONIC SUB-ASSEMBLIES AND METHOD OF FABRICATING

Russell I. Mason, Barneveld, N.Y., assignor to General Electric Company, a corporation of New York Filed Apr. 15, 1958, Ser. No. 728,622
5 Claims. (Cl. 317—101)

This invention relates generally to techniques for developing and manufacturing electrical equipment, and more particularly to modular electronic sub-assemblies and an improved method of fabricating such electronic sub-assemblies.

In modern day processes for fabricating electronic equipment and systems, the advantages of constructing separately packaged sub-assemblies have been amply demonstrated. For instance, the ease and rapidity with which such units may be completed by relatively untrained personnel have been a large factor in the increasingly wide use of this assembly technique. By dividing extremely complex combinations of vacuum tubes, resistors, inductors, and the like into a number of self-contained building blocks suitable for later integration, complete systems have been drastically reduced in size.

This, of course, is because the location and securing of the components in such self-contained building blocks is a process which lends itself readily to the routine and repetitive series of unskilled operations which characterize mass production techniques. By practicing these techniques, it is common to arrange the production of such self-contained sub-assemblies to provide individual modulator units, rectifier units, power supply units, detector units, and the like. The simplifications in cost-accounting, time and motion study, and quality control which accompany this method of electronic manufacture are known to those skilled in the art.

The advantages which result from the fabrication of such diverse self-contained units in modular type electronic assembly techniques are equally impressive. For instance, in electronic instrumentation for airborne equipment it is essential that the completed systems be formed of compact readily-replaceable units. This means that defective or inoperative stages of circuitry may be detected and replaced simply by the substitution of a standardized sub-assembly. Since the various interchangeable building blocks such as oscillators, discriminators, and the like are packaged in housings are all dimensionally similar in modular assembly systems the replacement of the troublesome circuitry is easily effected. By this means, rapid diagnosis and replacement of defective electronic gear to operational status is efficiently accomplished. The method of constructing easily packaged modular electronic sub-assemblies according to the present invention will be discussed in detail later in this specification in connection with the detailed description of the invention.

The present invention contemplates an entirely new method of fabricating such electronic sub-assemblies, or building block units. By practicing this method, the cost of manufacturing electronic systems may be substantially reduced. Moreover, because of the extreme simplicity of the inventive method, perfect electronic assembly work may be accomplished by almost totally untrained operators. In addition to these advantages, the inherent nature of the method expedites and simplifies the application of automation processes in placing and securing electronic components within an electronic sub-assembly. By mounting electrical components in the desired spatial orientation on reticulate configuration such as mesh fabric, and employing dip soldering techniques or the like to provide the requisite connections, the task of providing completed electronic sub-assemblies is reduced to basic simplicity. After the soldering operation, the units may be immersed, sprayed, or otherwise coated with a suitable plastic material such as a resin in order to secure and strengthen them. By coating both sides of such units a thin film or skin of plastic is caused to encase the complete sub-assembly. Such a thin film provides the sealing and protection afforded by conventional potting or encapsulation techniques without incurring the undesirable temperature rises occasioned thereby. This is because heat dissipation through the thin plastic coating occurs at a rate which is significantly more rapid than in the case of conventional potted sub-assemblies. The reduction in the size and the weight of the completed unit afforded by such thin plastic coatings is an obvious advantage where airborne or shipborne weapons systems are concerned. The removal and replacement of a defective electronic component is possible by merely removing the plastic coating provided around the unit. After being connected within the circuit, the substitute electrical component may be readily encased within a new layer of plastic, such as resin or the like, to restore the structural integrity of sub-assembly.

The utility of the present invention in developmental work will be evident to those skilled in the art. Within a limited time interval, any of a number of alternative placement schemes for a large group of electrical components may be analyzed and tested for undesirable interaction between the various elements. Thus, the optimum spatial interrelationships between several inductors or transformers may be readily determined in a minimum of time. The superiority of the present assembly technique over conventional developmental "breadboard" apparatus is believed clear.

Accordingly, therefore, a primary object of the present invention is to disclose an ingenious method of fabricating electronic sub-assemblies.

Another object of the invention is to provide an improved manufacturing method which permits simple and rapid assembly of electronic components into completed units.

Still another object of the present invention is to provide an entirely new concept and technique for emplacing and securing electrical components within a modular electronic sub-assembly.

A further object of the invention is to disclose a method of constructing self-contained electronic units which lend themselves readily to groupings and combinations in a supporting structure.

A still further object of the present invention is to advance the art of modular electronic packaging by providing a method and apparatus for producing a plurality of electronic building block units capable of compact groupings in nested relationship.

These and other objects and advantages of the present invention will become apparent by referring to the following detailed description and drawings in which like numerals indicate like parts, and in which.

Figures 1, 4:
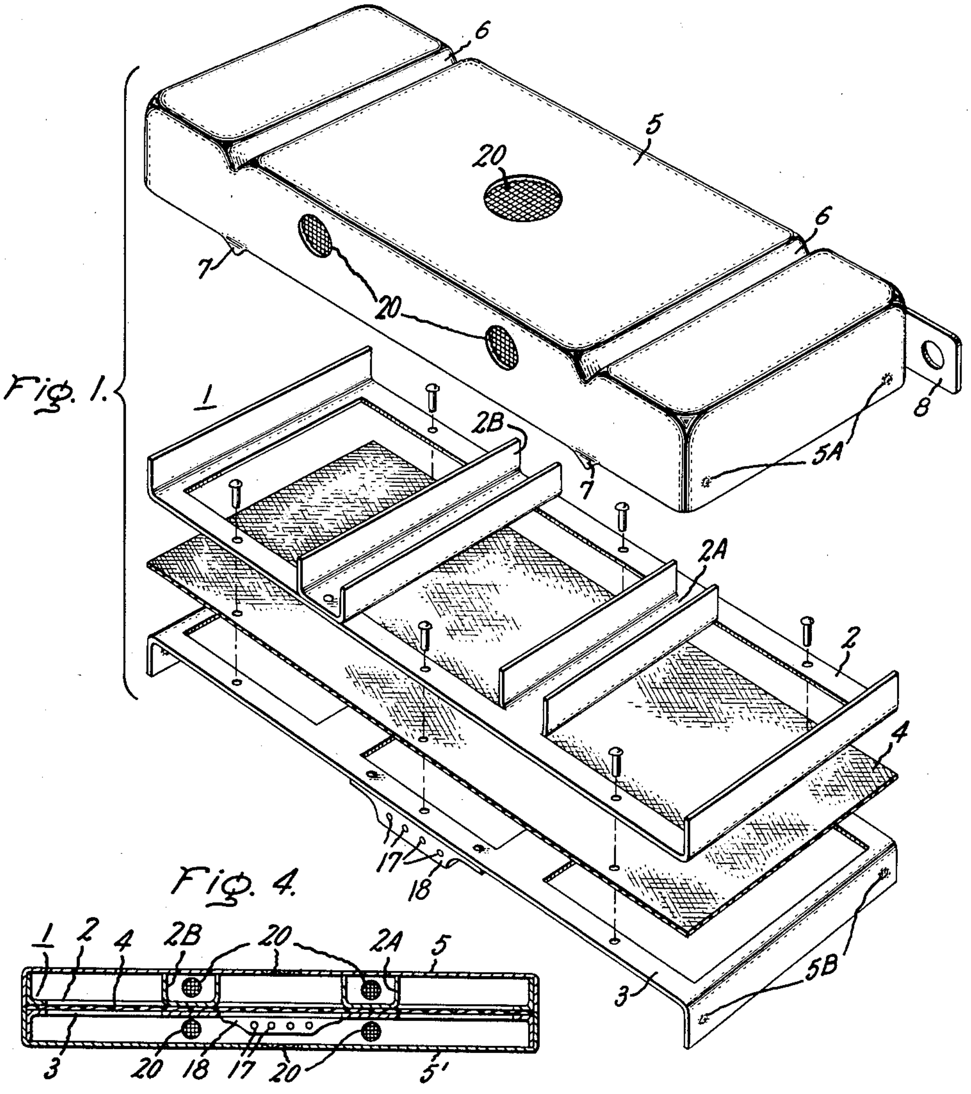
FIGURE 1 shows an exploded perspective view of a frame unit for one of the electronic sub-assemblies.
FIGURE 4 shows a front elevation view in section of a sub-assembly similar to that of FIG. 1 but having a separate cover plate for top and bottom.

Turning now to the detailed description of the invention, and more particularly to the embodiment thereof shown in FIGURE 1, the numeral 1 has been used to indicate generally the frame unit which is used in fabricating electronic sub-assemblies according to the teachings of the present invention. This frame unit will be seen to include a formed or shaped upper frame member 2 as well as a similarly shaped flat lower frame member 3. The shape of these frame members is shown for illustration of a particular embodiment of the invention and it is to be understood that the frame members can be of any number of shapes or design and of desired strength within the teachings of this invention.

Between the upper and lower frame members there is provided an oblong section of open mesh fabric 4. The mesh fabric 4 is comprised of interwoven strands of insulating material, and may take the form of a suitable commercially available material such as fiberglass, or the like. In general, the fabric 4 may comprise any suitable reticulate configuration, or network-like arrangement of elongated retiform non-conductive elements. In securing the upper frame member to the lower frame member, the fabric 4 is stretched across the peripheral edges of the respective frame members and fastened therebetween. This provides open surfaces of fabric through which the lead-wires of certain electrical components may be inserted.

In order to properly dissipate the heat energy which is generated by certain components within the electrical sub-assemblies, channel members 2A and 2B are provided on the upper frame member. These channels may be integral with the material of the frame member and shaped therefrom, as in the case of the channel member 2A. Or, alternatively, channel members formed of commercially available channel stock or extruded shapes may be fastened to the peripheral edges of the upper frame member, as in the case of the channel member 2B.

In order to encase the completed electrical sub-assemblies, and provide electrical shielding from extraneous magnetic fluxes and the like, a metallic cover plate 5 is provided. After the assembly of the respective frame members, mesh fabric, and associated parts, the cover plate 5 may be positioned with respect to the frame unit to substantially enclose and shield the electrical components within the completed unit. The retention of the cover plate 5 may be effected by means of a pair of indentations 5A stamped or otherwise imprinted into the surface of one end portion thereof. The indentations 5A are positioned to resiliently engage a pair of matching indentations 5B provided in the lower frame member 3. It should be appreciated that the opposite end portion of the cover plate 5 is provided with similar indentations which engage mating indentations in the corresponding surface of the lower frame member.

In order to permit the arrangement of several of the sub-assemblies in nested relationship, the metallic cover plate 5 is provided with a pair of spaced V-shaped grooves 6 in the upper surface thereof. In addition, a pair of tabs 7 is provided on the edge member of the cover plate. The tabs 7 are slightly bent or inclined from the vertical plane. By virtue of this construction feature, the tabs 7 may be caused to slide and nest in the spaced grooves provided in the cover plate of an adjacent sub-assembly desired to be placed in proximity with one similar to that discussed in connection with FIGURE 1. The provision for racking a plurality of sub-assemblies in nested relationship is shown most clearly in FIGURE 2, and will be discussed again in connection with the detailed description thereof.

In order to rapidly dissipate heat energy produced within the interior of the encased frame unit, the channels 2A and 2B referred to immediately above are maintained in good heat exchange relationship with the edge surface of the upper frame member. The heat which is dissipated in this manner will flow through the channels by convection and by conduction to the ends of the upper and lower frame members, and thence to the engaging end surfaces of the metallic cover plate 5. The rear edge surface of the plate 5 or frames 2 and 3 are provided with a metallic tab 8 for the purpose of expediting the flow of unwanted thermal energy to a heat sink. Also the top surface and the front and rear edge surfaces of the cover plates are provided with screened openings 20 to facilitate ventilation and heat dissipation. The method by which the tabs of the several components are commonly connected to drain heat energy will be described more fully in connection with FIGURE 2.

Figure 2:
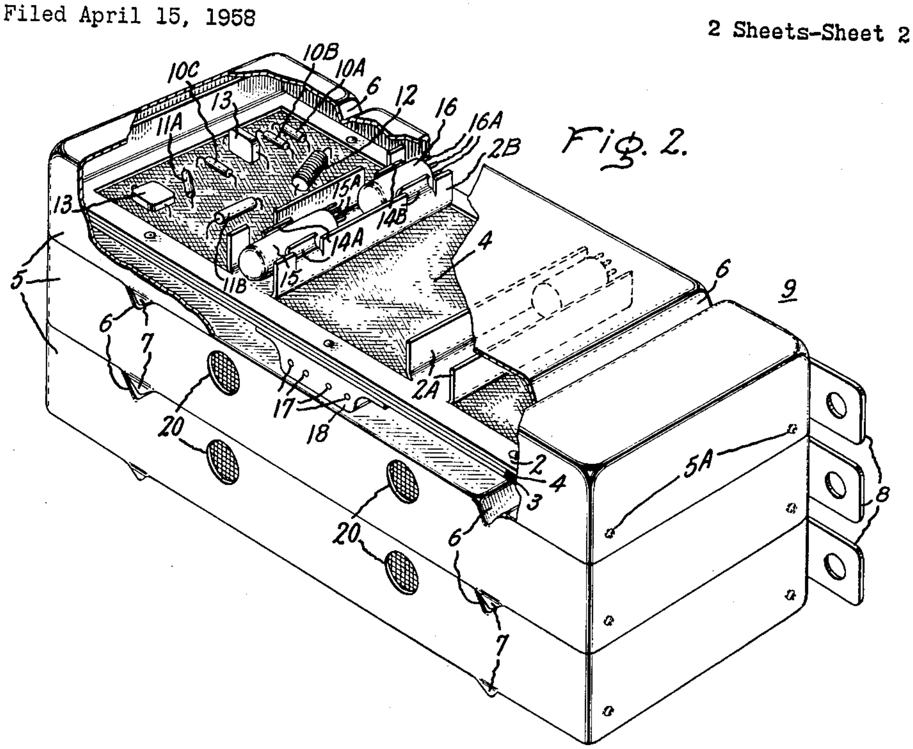
FIGURE 2 shows a fragmentary perspective view of several sub-assemblies in nested relationship, and illustrates the placement of certain electronic components in the open mesh fabric employed in practicing the invention.

Continuing now with the detailed description and turning to FIGURE 2, the numeral 9 has been used to designate generally a fragmentary perspective view of one sub-assembly constructed according to the invention in nested relationship with several similar sub-assemblies. Electronic components may be placed and oriented within the open mesh fabric in a predetermined manner, e.g. as illustrated in FIG. 2.

Thus, the resistors 10A, 10B, and 10C have been oriented by causing the respective lead wires thereof to penetrate the fabric 4. The foil-type condensers 11A, 11B, are similarly placed in spaced relationship with the earlier mentioned resistors as are the inductance coil 12 and the postage stamp condensers 13.

In practicing the invention, components such as these resistors, condensers and inductances can be permanently mounted in any desired spatial relationship by causing the respective lead-wires to penetrate the mesh fabric and protrude on the opposite side. In order to secure the respective components in any particular location, the appropriate lead-wires may be tightly twisted together by means of a conventional wrap-around technique. Where it is necessary for the lead-wires of several components to cross, or otherwise remain in proximity, hollow insulated sleeving or the like may be utilized. The method of emplacing the insulated sleeving 12' is best illustrated in the bottom perspective view provided in FIGURE 3 of the drawings.

After the desired interconnections between the respective lead-wires have been made, permanent junctions may be obtained by conventional dip soldering techniques. In order to accomplish this, the underside of the sub-assembly is immersed in a molten pool or bath of solder. This will effect a fused conductive juncture at the respective connection points.

Within the channel members 2A and 2B, provision is made for clamping or otherwise retaining electronic components such as vacuum tubes, transistors, or the like. Thus, in FIGURE 2, the channel member 2B is provided with crimped portions 14A and 14B. The crimped portion 14A is positioned to secure a first vacuum tube 15. In like manner, the crimped portion 14B engages another tube 16. These tubes may be plugged into sockets (not shown) or wired directly into the circuit by connections to the prongs 15A and 16A. The appearance of the crimped portions 14A and 14B engaging tubes 15 and 16, illustrates the structural provision for clamping the tubes, within the channel member 2A. This design facilitates the positive conduction of heat from the tubes, to the channels through the frame members 2 and 3 to the cover plate 5. Where a number of the sub-assemblies constructed according to the invention are combined in nested relationship, tube sockets (not shown) may be provided in the equipment.

In FIGURE 2 in the right hand portion, the provision for the tabs 8 which drain unwanted heat energy is clearly shown. Each of the cover plates 5 or the frames 2 and 3 is provided with such a tab which is affixed in good heat exchange relationship to the rear edge surface thereof. By coupling the several tabs in common to a good thermal conductor, such as a copper braid strap or the like, a large portion of the heat energy produced in the metallic cases may be readily disposed of.

Returning momentarily to the method of practicing the invention, reference will again be made to the several electronic components mounted upon the mesh fabric in FIGURE 2. After these components have been subjected to the soldering operation, and the vacuum tubes have been mounted within the channel members, the entire unit may be dipped in or otherwise coated with plastic such as a suitable resin which secures and protects the various parts. The plastic coating thus provided serves to stiffen and strengthen the completed sub-assembly. The coating of both sides of the assembly in order to provide a thin plastic shell, lends even greater rigidity and structural strength. This method of embedding the various components in a thin hardened plastic matrix has proved to result in a cooling rate markedly superior to that which characterizes complete "potting" or encapsulation. It will be observed that convective heat loss through the channel members, frame members and associated tabs is in no way impaired by the plastic coating process.

Figure 3:
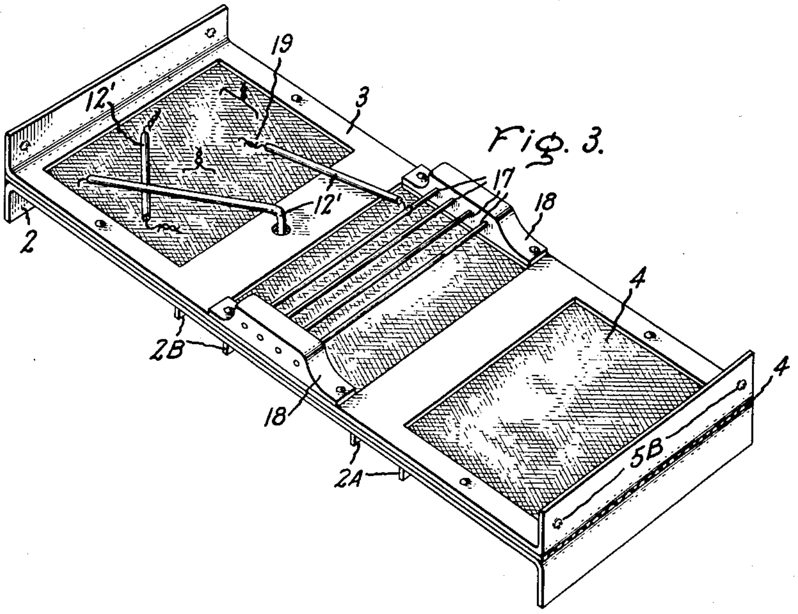
FIGURE 3 shows a perspective bottom view of one of the sub-assemblies constructed according to the invention, and illustrates the method of securing the lead-wires of the respective components.

In order to provide for the ingress of operating potential to the various sub-assemblies, the invention provides a plurality of electrical bus bars 17. These bus bars are mounted in sets of insulating plugs 18 which are secured to the underside of the lower frame member. In FIGURE 3 the mode of interconnecting one of the bus bars to an appropriate conductor lead 19 is illustrated.

A modification in constructing the cover of a sub-assembly into a top cover 5 and a bottom 5' where the invention is used as a single unit is shown in FIG. 4. Like numerals are used to identify similar parts shown in figures heretofore described.

Figure 5:
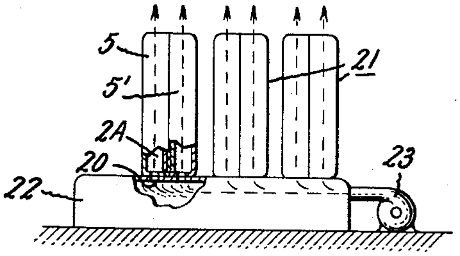
FIGURE 5 shows a view of several sub-assemblies similar to the one shown in FIG. 4, mounted on a plenum chamber for forced air ventilation, directed up through their associated vents.

FIG. 5 of the drawings shows the invention further applied where several modules 21 are mounted (by any suitable fastening means not shown), to a plenum chamber 22, which is ventilated by a forced air means 23, and directed through the vents 20 cut in the covers 5 and 5'. Each module 21 comprises cover plates 5 and 5' and the frame unit 1 described in FIG. 1.

Where space limitations require extremely compact packaging, the invention contemplates the use of mesh fabric in which the bus leads are actually woven into the fabric. This is accomplished by interposing conductive strands at spaced intervals within the mesh fabric. Or, if desired, operating potential may be applied to the several components within the unit, via conductive patterns which have been stamped or otherwise affixed to the surface of the mesh fabric. These patterns may take the form of thin metallic foil strips which have been cemented or otherwise secured to the surface of the fabric.

In general, the invention is not to be regarded as limited to any specific method of conveying electrical operating potentials from the exterior of the sub-assemblies to the components located therewithin.

While preferred forms of the invention have been illustrated and described, it is to be understood that other modifications may now suggest themselves to those skilled in the art, all within the scope of the appended claims.

What is claimed is:

1. A modulator sub-assembly for use in fabricating electronic systems including a first frame member having apertures therein, a second frame member having apertures therein to be aligned with the apertures in the first frame member, a non-conductive woven surface positioned between said first and second frame members and stretched beyond the peripheral edges of the respective frame member apertures, means to fasten said first frame member to said second frame member with said apertures in alignment and said woven surface therebetween, said surface being adapted to receive a group of electronic components positioned with portions thereof penetrating the apertures of said surface, and a cover plate positioned to enclose the frame members and the electronic components within the sub-assembly.

2. A modular sub-assembly for use in fabricating electronic systems including a first frame member having apertures therein, a second frame member having apertures therein to be aligned with the apertures in the first frame member, a non-conductive woven surface positioned between said first and second frame members and stretched beyond the peripheral edges of the respective frame member apertures, means to fasten said first frame member to said second frame member with said apertures in alignment and said woven surface therebetween, said surface being adapted to receive a group of electronic components positioned with portions thereof penetrating the apertures, at least one channel member extending from a face of one of said frame members in which other electronic components may be secured, and a cover plate positioned to enclose the frame members and electronic components positioned within said surface and each of said channels.

3. A modular sub-assembly for use in fabricating electronic systems including a first frame member having apertures therein, a second frame member having apertures therein to be aligned with the apertures in the first frame member, a non-conductive woven surface positioned between said first and second frame members and stretched beyond the peripheral edges of the respective frame member apertures, means to fasten said first frame member to said second frame member with said apertures in alignment and said woven surface therebetween, said surface being adapted to receive a group of electronic components positioned with portions thereof penetrating the apertures, at least one channel member extending from a face of one of said frame members in which other electronic components may be secured, a cover plate positioned to enclose the frame members and electronic components positioned within said surface and each of said channels, and tab means secured to the outer surface of the cover plate to conduct heat away from the sub-assembly.

4. A modular sub-assembly for use in fabricating electronic systems including a first frame member having apertures therein, a second frame member having apertures therein to be aligned with the apertures in the first frame member, a non-conductive woven surface positioned between said first and second frame members and stretched beyond the peripheral edges of the respective frame member apertures, means to fasten said first frame member to said second frame member with said apertures in alignment and said woven surface therebetween, said surface being adapted to receive a group of electronic components positioned with portions thereof penetrating the apertures of said surface, at least one channel member extending from a face of one of said frame members in which other electronic components may be secured, a cover plate having a top surface and four sides depending therefrom positioned to enclose the frame members and the electronic components within said surface and each of said channels, and cooling vents in said cover plate.

5. A modular sub-assembly for use in fabricating electronic systems including a first frame member having apertures therein, a second frame member having apertures therein to be aligned with the apertures in the first frame member, a non-conductive woven surface positioned between said first and second frame members and stretched beyond the peripheral edges of the respective frame member apertures, means to fasten said first frame member to said second frame member with said apertures in alignment and said woven surface therebetween, said surface being adapted to receive a group of electronic components positioned with portions thereof penetrating the apertures of said surface, at least one channel member extending from a face of one of said frame members in which other electronic components may be secured, a cover plate having a top surface and four sides depending therefrom positioned to enclose the frame members and the electronic components within said surface and each of said channels, and cooling vents in the sides of said cover plate adjacent the ends of each of said channels.

References Cited in the file of this patent

UNITED STATES PATENTS

| | | |
|---|---|---|
| 1,629,112 | MacDonald | May 17, 1927 |
| 1,749,755 | Downer | Mar. 11, 1930 |
| 1,803,310 | Basseches | May 5, 1931 |
| 1,816,413 | Way | July 28, 1931 |
| 2,613,252 | Heibel | Oct. 7, 1952 |
| 2,647,224 | Bruck | July 28, 1953 |
| 2,693,584 | Pifer | Nov. 2, 1954 |

| | | |
|---|---|---|
| 2,699,424 | Nieter | Jan. 11, 1955 |
| 2,884,571 | Hannahs | Apr. 28, 1959 |
| 2,885,601 | Pessel | May 5, 1959 |
| 2,898,520 | Sterner | Aug. 4, 1959 |
| 2,898,522 | Handen | Aug. 4, 1959 |

FOREIGN PATENTS

| | | |
|---|---|---|
| 639,453 | Great Britain | June 28, 1950 |
| 664,024 | Great Britain | Jan. 2, 1952 |
| 718,811 | Great Britain | Nov. 24, 1954 |

OTHER REFERENCES

Proceedings of the I.R.E., November 1952, pages 1524–1528.

Radio and Television News, January 1954, pages 42, 43, and 107, an article: A "Basket Chassis" Transmitter.